United States Patent
Hsu et al.

(10) Patent No.: US 7,587,789 B2
(45) Date of Patent: Sep. 15, 2009

(54) HINGE WITH SIMPLIFIED COMPONENTS

(75) Inventors: Jia-Hao Hsu, Shulin (TW); An-Di Lu, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 318 days.

(21) Appl. No.: 11/598,294

(22) Filed: Nov. 13, 2006

(65) Prior Publication Data

US 2008/0109990 A1 May 15, 2008

(51) Int. Cl.
*E05D 3/10* (2006.01)
(52) U.S. Cl. .................................... 16/367
(58) Field of Classification Search .............. 16/267, 16/337–340
See application file for complete search history.

(56) References Cited

U.S. PATENT DOCUMENTS

| | | | | |
|---|---|---|---|---|
| 7,146,195 B2 * | 12/2006 | Sudo et al. | ............... | 455/575.1 |
| 7,222,396 B2 * | 5/2007 | Lu et al. | ............... | 16/340 |
| 2005/0283949 A1 * | 12/2005 | Lu et al. | ............... | 16/367 |
| 2008/0034547 A1 * | 2/2008 | Hsu | ............... | 16/367 |
| 2008/0034549 A1 * | 2/2008 | Lee et al. | ............... | 16/367 |
| 2008/0098568 A1 * | 5/2008 | Hsu | ............... | 16/367 |
| 2008/0109996 A1 * | 5/2008 | Hsu et al. | ............... | 16/367 |

* cited by examiner

*Primary Examiner*—Victor Batson
*Assistant Examiner*—Matthew Sullivan
(74) *Attorney, Agent, or Firm*—William E. Pelton, Esq.; Cooper & Dunham LLP

(57) ABSTRACT

A hinge with simplified components has a central bracket, a first tilt hinge assembly, a second tilt hinge assembly and a rotating hinge assembly. The central bracket has a main arm, a first arm and a second arm. The rotating hinge assembly has a stationary limiting spacer and a rotating limiting spacer corresponding to each other. With the rotating limiting spacer has is thicker than the stationary limiting spacer, the rotating limiting spacer replaces many spacers. Therefore, the components of the hinge are simplified and then the manufacturing cost and the assembling complexity are decreased.

14 Claims, 14 Drawing Sheets

HINGE WITH SIMPLIFIED COMPONENTS

BACKGROUND OF THE INVENTION

1. Field of the Invention

The present invention relates to a hinge, especially to a hinge with simplified components mounted between a cover and a base of an electronic appliance.

2. Description of the Prior Arts

Electrical appliances such as notebook computers, cell phones, etc. have a cover, a base and a conventional hinge. The conventional hinge connects the cover to the base along a transverse axis and a longitudinal axis to allow the cover to pivot relative to the base. To keep the electronic appliance from damaging when the cover is pivoted relative to the base, the conventional hinge comprises many spacers having corresponding structures to provide positioning and limiting functions. However, many spacers increase manufacturing cost and enhance assembling complexity.

To overcome the shortcomings, the present invention provides a hinge with simplified components to mitigate or obviate the aforementioned problems.

SUMMARY OF THE INVENTION

The main objective of the present invention is to provide a hinge with simplified components. The hinge with simplified components has a central bracket, a first tilt hinge assembly, a second tilt hinge assembly and a rotating hinge assembly. The central bracket has a main arm, a first arm and a second arm. The rotating hinge assembly has a stationary limiting spacer and a rotating limiting spacer corresponding to each other. With the rotating limiting spacer is thicker than the stationary limiting spacer, the rotating limiting spacer replaces many spacers. Therefore, the components of the hinge in accordance with the present invention are simplified and then the manufacturing cost and the assembling complexity are decreased.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
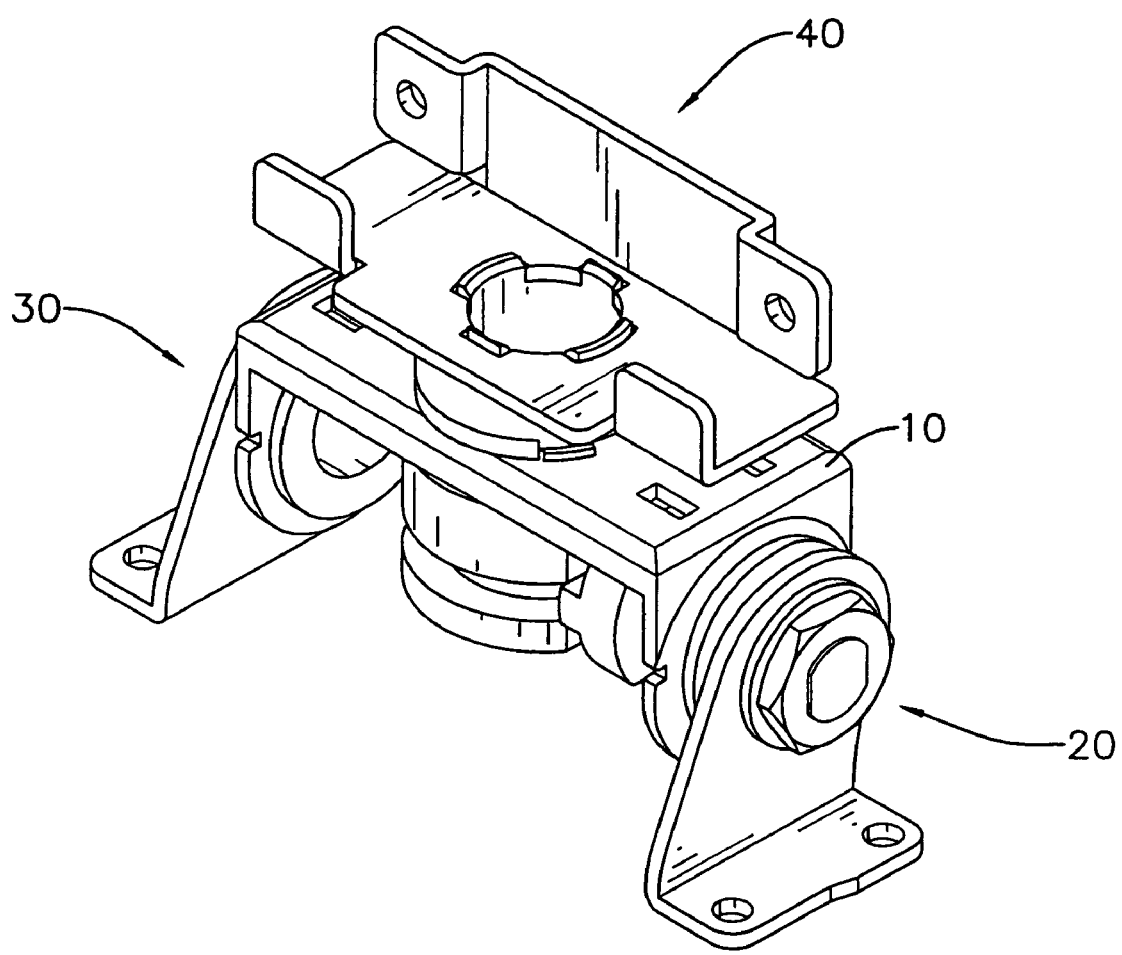
FIG. 1 is a perspective view of a first embodiment of a hinge in accordance with the present invention.
Figure 2:
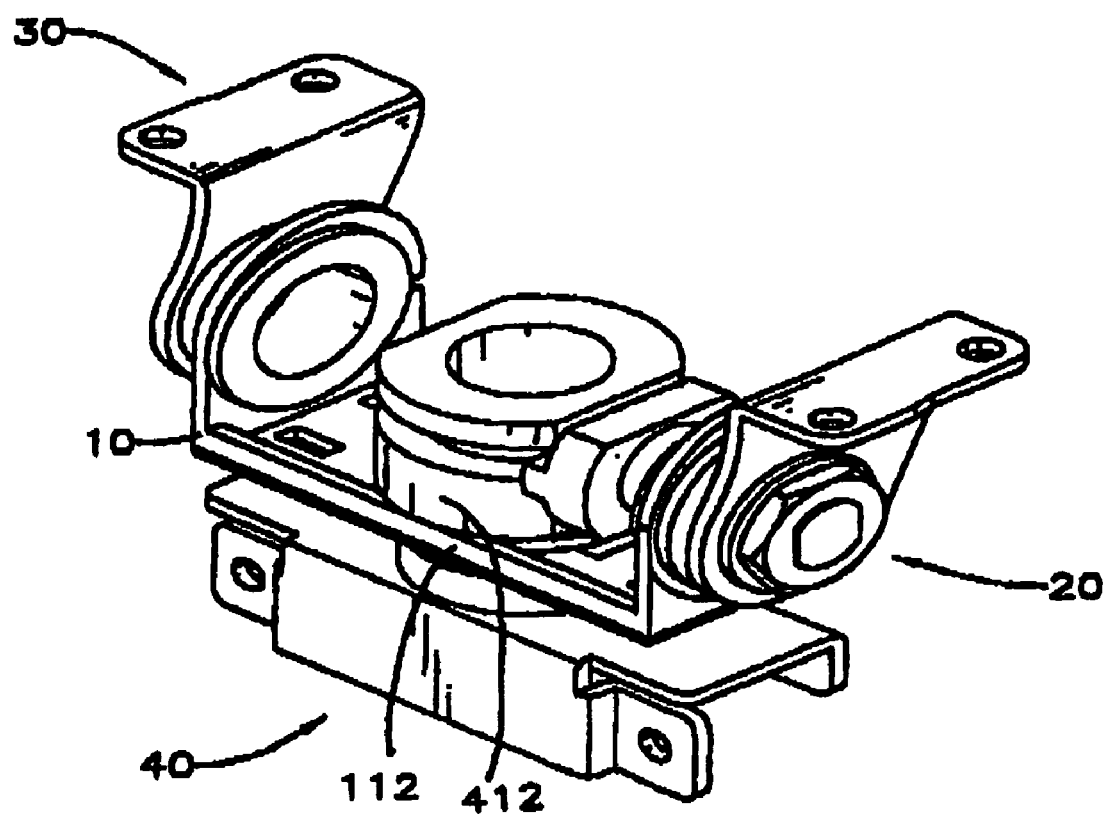
FIG. 2 is another perspective view of the hinge in FIG. 1.

With reference to FIGS. 1 and 2, a hinge in accordance with the present invention comprises a central bracket (10), a first tilt hinge assembly (20), a second tilt hinge assembly (30) and a rotating hinge assembly (40).

Figure 3:
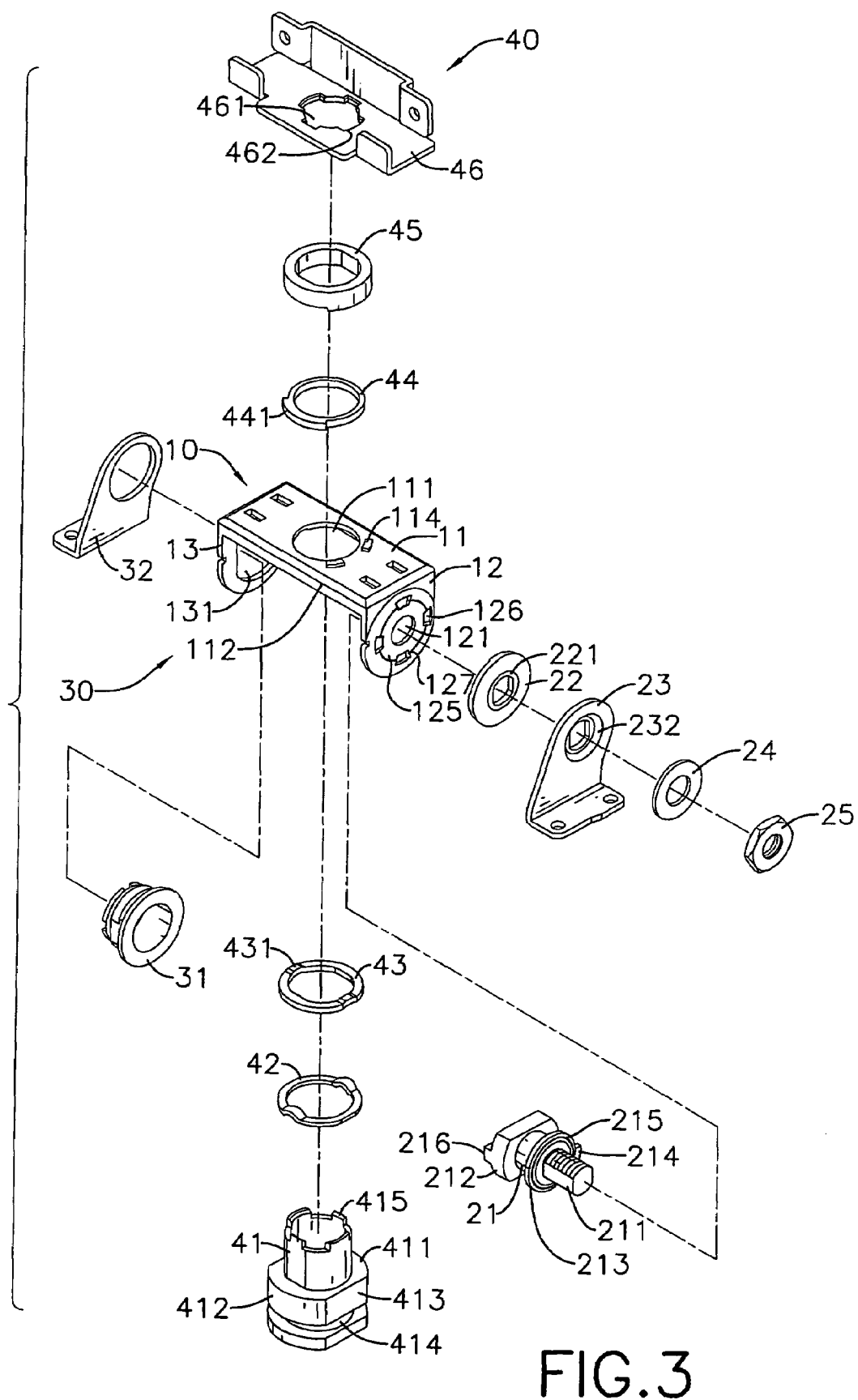
FIG. 3 is an exploded perspective view of the hinge in FIG. 1.
Figure 4:
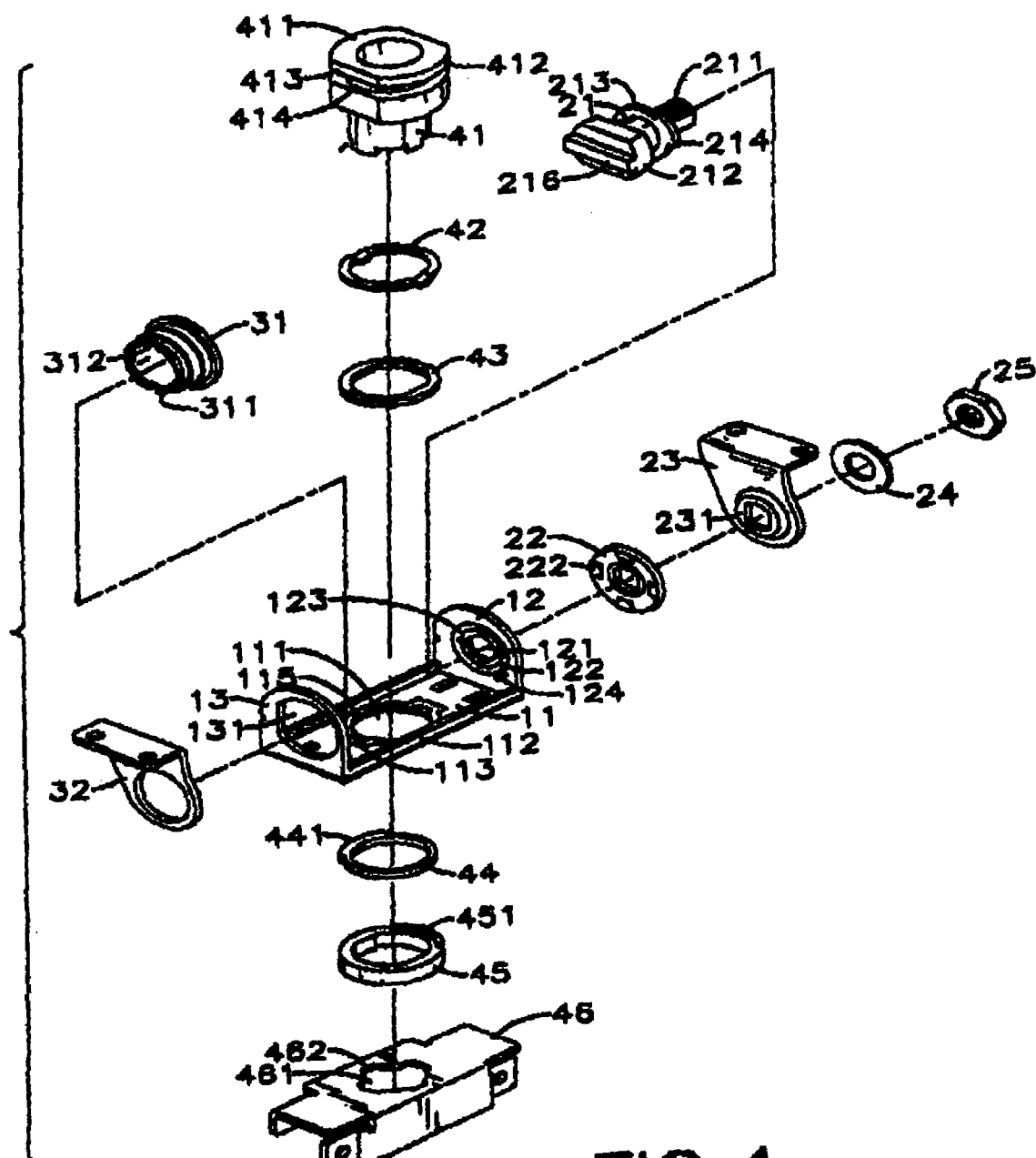
FIG. 4 is another exploded perspective view of the hinge in FIG. 1.
Figure 5:
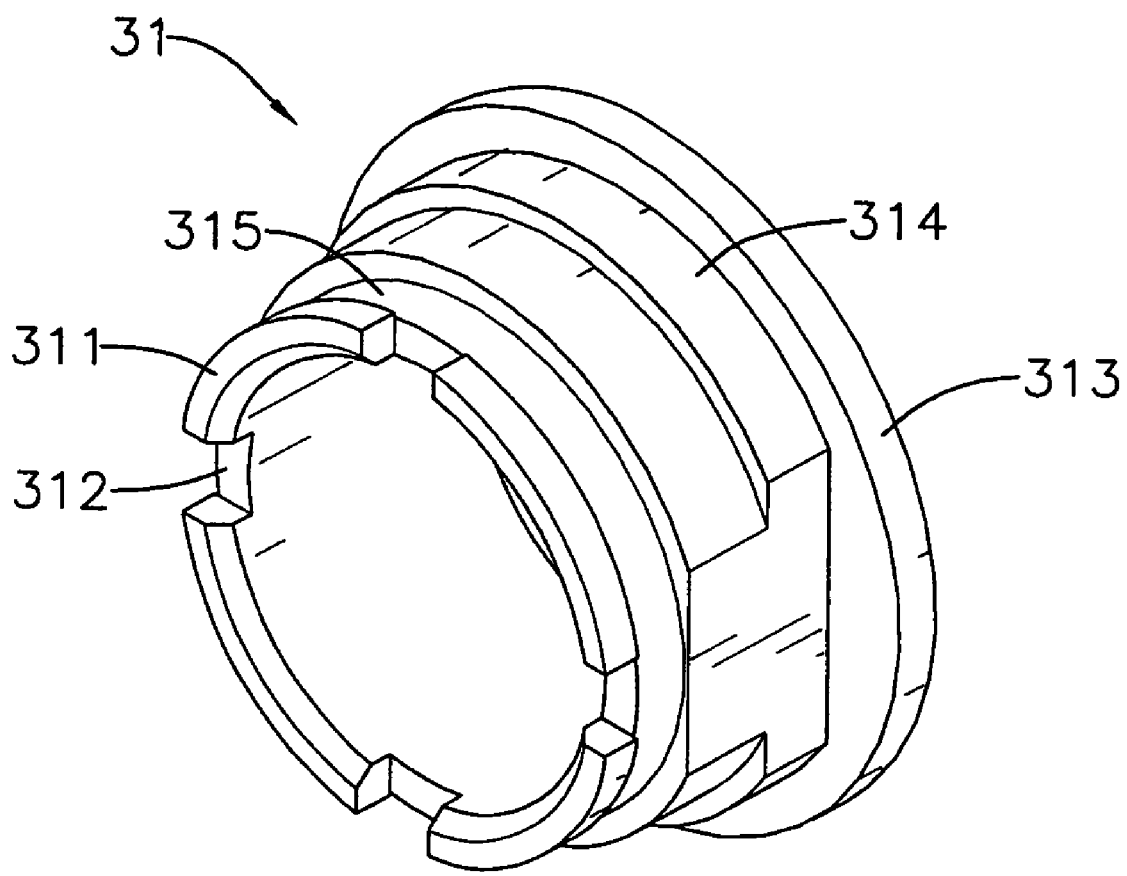
FIG. 5 is perspective view of a barrel of the hinge in FIG. 1.

With reference to FIGS. 3 and 4, the central bracket (10) is U-shaped and comprises a main arm (11), a first arm (12) and a second arm (13).

The main arm (11) has a first end, a second end, an inner surface, an outer surface, two sides, a circular central hole (111), two ribs (112), an annular recess (115), at least one positioning detent (113), at least one limiting protrusion (114). The ribs (112) are respectively and perpendicularly formed on the two sides of the main arm (11) toward the inner surface. The annular recess (115) is formed in the inner surface of the main arm (11) around the central hole (111). The at least one positioning detent (113) is formed in the annular recess (115). The at least one limiting protrusion (114) is formed on and extends from the outer surface of the main arm (11).

The first arm (12) is formed perpendicularly on the first end of the main arm (11). The first arm (12) has an inner surface, an outer surface, a circular central hole (121), an inner annular recess (122), an inclined surface (123), at least one limiting protrusion (124), an outer annular recess (125), at least one positioning detent (126) and an oil channel (127). The inner annular recess (122) is formed in the inner surface of the first arm (12) around the central hole (121). The inclined surface (123) is formed around the inner annular recess (122). The at least one limiting protrusion (124) is formed on and extends from the inner surface of the first arm (12). The outer annular recess (125) is formed in the outer surface of the first arm (12) around the central hole (121). The at least one positioning detent (126) is formed in the outer annular recess (125). The oil channel (127) is formed in the outer annular recess (125).

The second arm (13) is formed perpendicularly on the second end of the main arm (11) and has a non-circular central hole (131).

The first tilt hinge assembly (20) connects to the first arm (12) of the central bracket (10) and comprises a tilt shaft (21), a stationary positioning spacer (22), a first rotating bracket (23), a washer (24) and a fastener (25).

The tilt shaft (21) connects rotatably to the first arm (12) of the central bracket (10) and has an inner end, an outer end, an extension rod (211), a positioning head (212), a limiting head (213), a limiting protrusion (214), an annular protrusion (215) and a positioning protrusion (216). The extension rod (211) is formed axially on the outer end of the tilt shaft (21) and extends through the central hole (121) of the first arm (12). The extension rod (211) may be a threaded rod. The positioning head (212) is formed radially on the inner end of the tilt shaft (21). The limiting head (213) is formed radially on the outer end of the tilt shaft (21). An outer surface of the limiting head (213) abuts the inner surface of the first arm (12). The limiting protrusion (214) is formed transversely on an edge of the limiting head (213) and selectively abuts the at least one limiting protrusion (124) of the first arm (12). The annular protrusion (215) is formed on the outer surface of the limiting head (213) around the extension rod (211) and corresponds to and engages the inner annular recess (122) of the first arm (12). The positioning protrusion (216) is formed on an inner surface of the positioning head (212).

Figure 6:
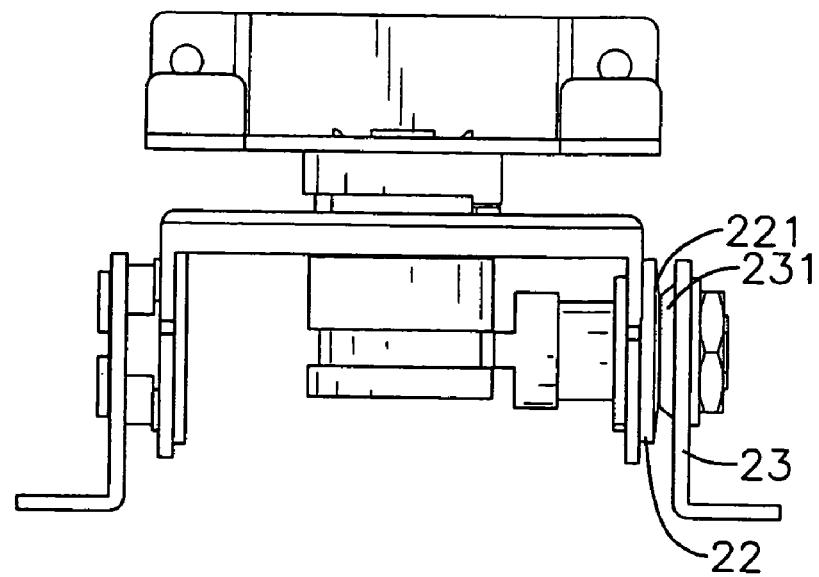
FIG. 6 is a side view of the hinge in FIG. 1.
Figure 7:
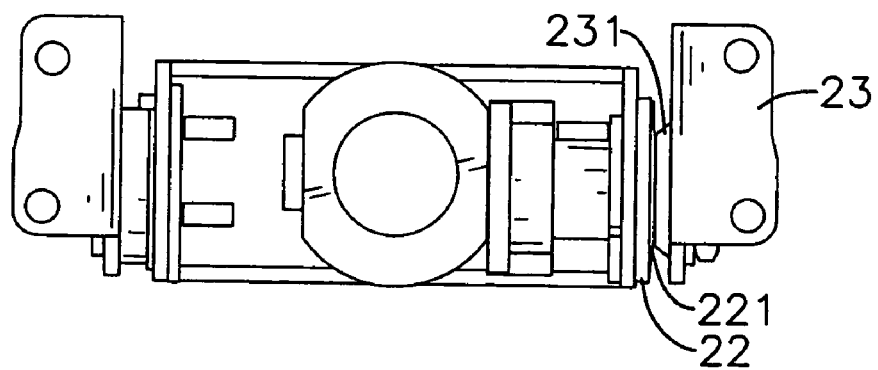
FIG. 7 is a bottom view of the hinge in FIG. 1.

With further reference to FIGS. 6 and 7, the stationary positioning spacer (22) is mounted securely on the extension rod (211) of the tilt shaft (21) and is adjacent to the outer surface of the first arm (12). The stationary positioning spacer (22) is resilient, is ">-shaped" in side view and has an inner surface, an outer surface, a central protrusion (221) and at least one positioning protrusion (222). An annular edge of the inner surface of the stationary positioning spacer (22) abuts the outer surface of the first arm (12). The central protrusion (221) is formed axially around a central of the outer surface of the stationary positioning spacer (22). The at least one positioning protrusion (222) is formed on the inner surface of the stationary positioning spacer (22) and corresponds to and selectively engages the at least one positioning detent (126) of the first arm (12).

The first rotating bracket (23) is mounted securely on the extension rod (211) of the tilt shaft (21), is L-shaped and has a main leaf. The main leaf of the first rotating bracket (23) is mounted securely on the extension rod (211) of the tilt shaft (21) and has an inner surface, an outer surface, a central protrusion (231) and a central recess (232). The central protrusion (231) is formed axially around a central of the inner surface of the main leaf of the first rotating bracket (23) and abuts the central protrusion (221) of the stationary positioning spacer (22). The central recess (232) is formed in the outer surface of the main leaf of the first rotating bracket (23).

The washer (24) is mounted around the extension rod (211) of the tilt shaft (21). The fastener (25) is mounted securely on a tip of the extension rod (211) of the tilt shaft (21). The fastener (25) may be a nut screwed onto the extension rod (211).

With reference to FIGS. 3, 4, 5, 14, 15 and 16, the second tilt hinge assembly (30) connects to the second arm (13) of the central bracket (10) and comprises a barrel (31) and a second rotating bracket (32).

The barrel (31) connects securely to the second arm (13) of the central bracket (10), is non-circular in cross section and has an inner end, an outer end, an outer wall, multiple steps and an annular protrusion (311). The steps are formed along the outer wall of the barrel (31) and the diameters of the steps are reduced from the inner end to the outer end. The steps comprise a head (313) formed on the inner end of the barrel (31), an initial step (314) formed adjacent to the head (313), and a last step (315) formed on the outer end of the barrel (31). The head (313) of the barrel (31) has the largest diameter of the steps, the initial step (314) has the second largest diameter of the steps, and the last step (315) has the smallest diameter of the steps. The annular protrusion (311) extends axially out of the outer end of the barrel (31). Multiple gaps (312) are formed in the annular protrusion (311).

An extension wing (317) extends radially out of the inner end of the barrel (31) and abuts the main arm (11) of the central bracket (10) to increase stability.

The barrel (31) is mounted securely in the central hole (131) of the second arm (13) of the central bracket (10). The initial step (314) may be mounted tightly in the central hole (131) of the second arm (13) of the central bracket (10) to mount the barrel (31) securely in the central hole (131) of the second arm (13). The barrel (31) may have a fastening protrusion (316) extending radially out of the outer wall of the barrel (31) and abutting the outer surface of the second arm (13) to mount the barrel (31) securely in the central hole (131) of the second arm (13). The barrel (31) may be formed on the second arm (13).

The second rotating bracket (32) is mounted rotatably on the last step (315) of the barrel (31) and abuts the annular protrusion (311) of the barrel (31).

With reference to FIGS. 3 and 4, the rotating hinge assembly (40) connects to the main arm (11) of the central bracket (10). The rotating hinge assembly (40) comprises a central shaft (41), a resilient spacer (42), a rotating positioning spacer (43), a stationary limiting spacer (44), a rotating limiting spacer (45) and a fastening bracket (46).

The central shaft (41) connects rotatably to the main arm (11), extends through the central hole (111) of the main arm (11) and has an inner end, an outer end, a limiting head (411) and multiple fastening protrusions (415). The limiting head (411) is formed radially on the inner end of the central shaft (41), corresponds to the positioning head (212) of the tilt shaft (21) and has two limiting sides (412), two flat sides (413) and an annular slot (414). The limiting sides (412) are opposite to each other. The flat sides (413) are opposite to each other. Each limiting side (412) are formed between two flat sides (413). The limiting sides (412) and the flat sides (413) alternatively align with the positioning head (212) of the tilt shaft (21). The annular slot (414) is formed radially in the limiting head (411) of the central shaft (41) and corresponds to and selectively engages the positioning protrusion (216) of the positioning head (212) of the tilt shaft (21). The fastening protrusions (415) extend axially from the outer end of the central shaft (41).

The resilient spacer (42) is mounted around the central shaft (41).

The rotating positioning spacer (43) is mounted securely on the central shaft (41) and is adjacent to the inner surface of the main arm (11) and has at least one positioning protrusion (431). The at least one positioning protrusion (431) is formed on the rotating positioning spacer (43) and corresponds to and selectively engages the positioning detent (113) of the main arm (11).

Figure 13:
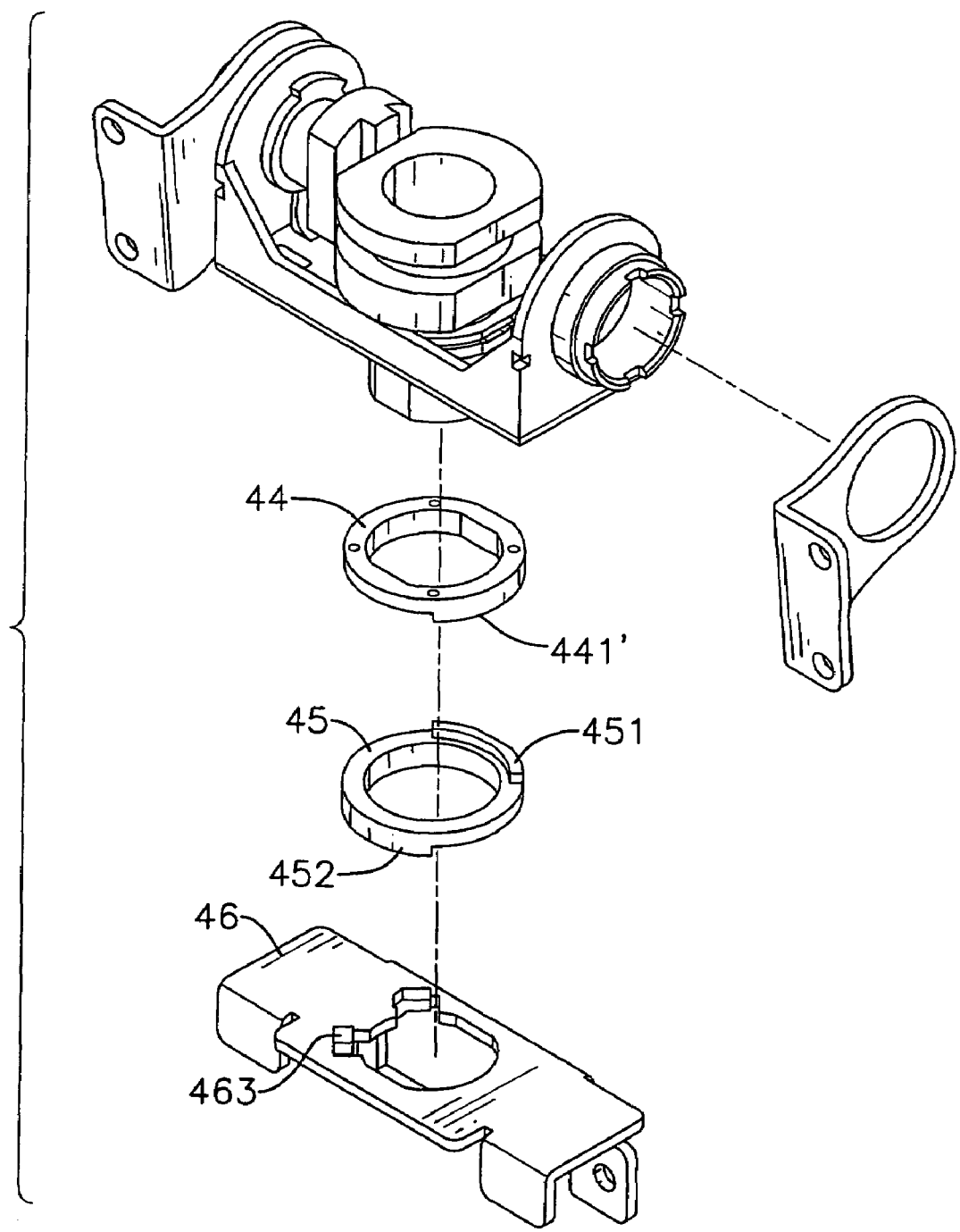
FIG. 13 is a partially exploded perspective view of a second embodiment of a hinge in accordance with the present invention.
Figure 14:
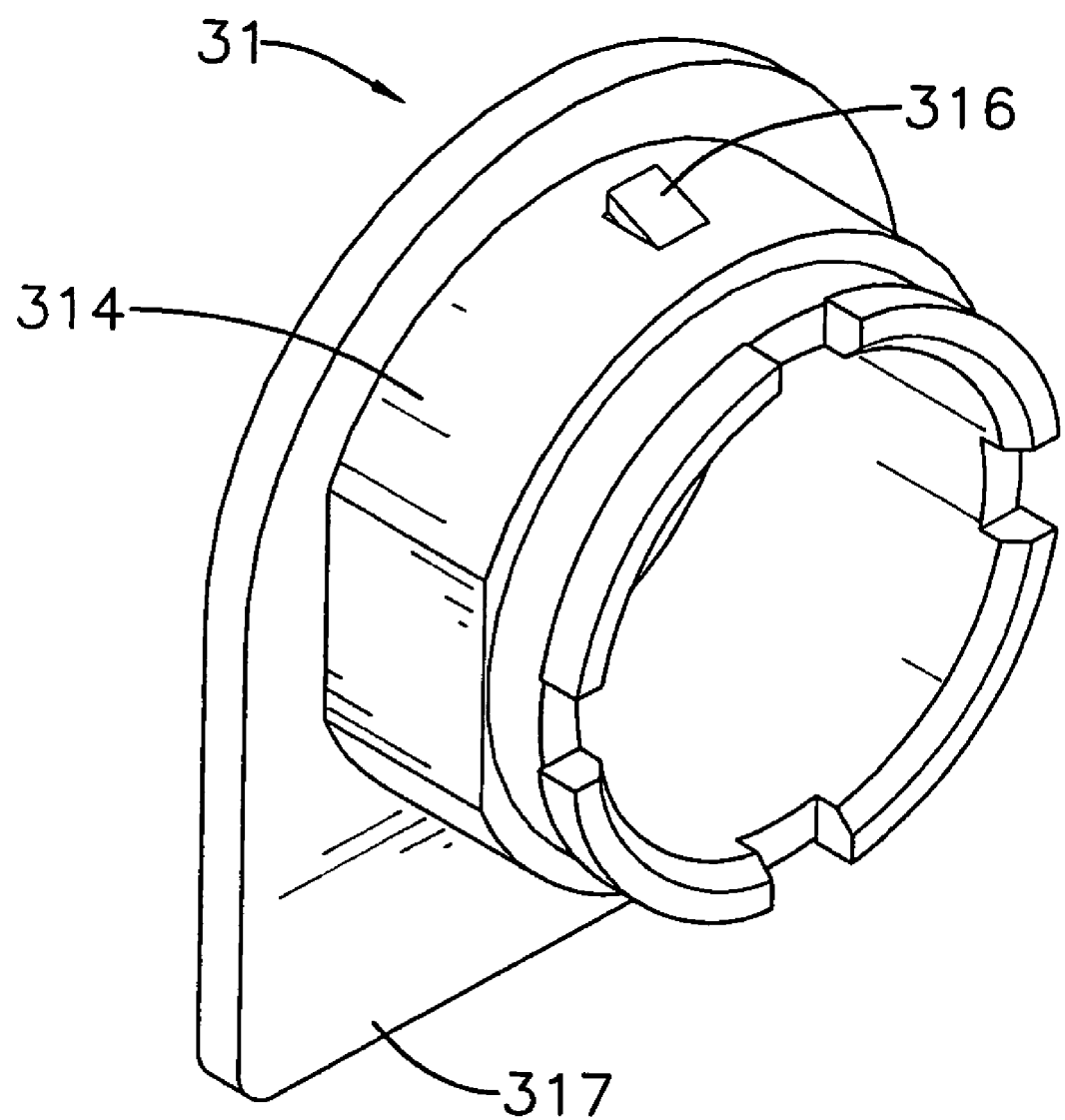
FIG. 14 is a perspective view of a barrel of a third embodiment of a hinge in accordance with the present invention.
Figure 15:
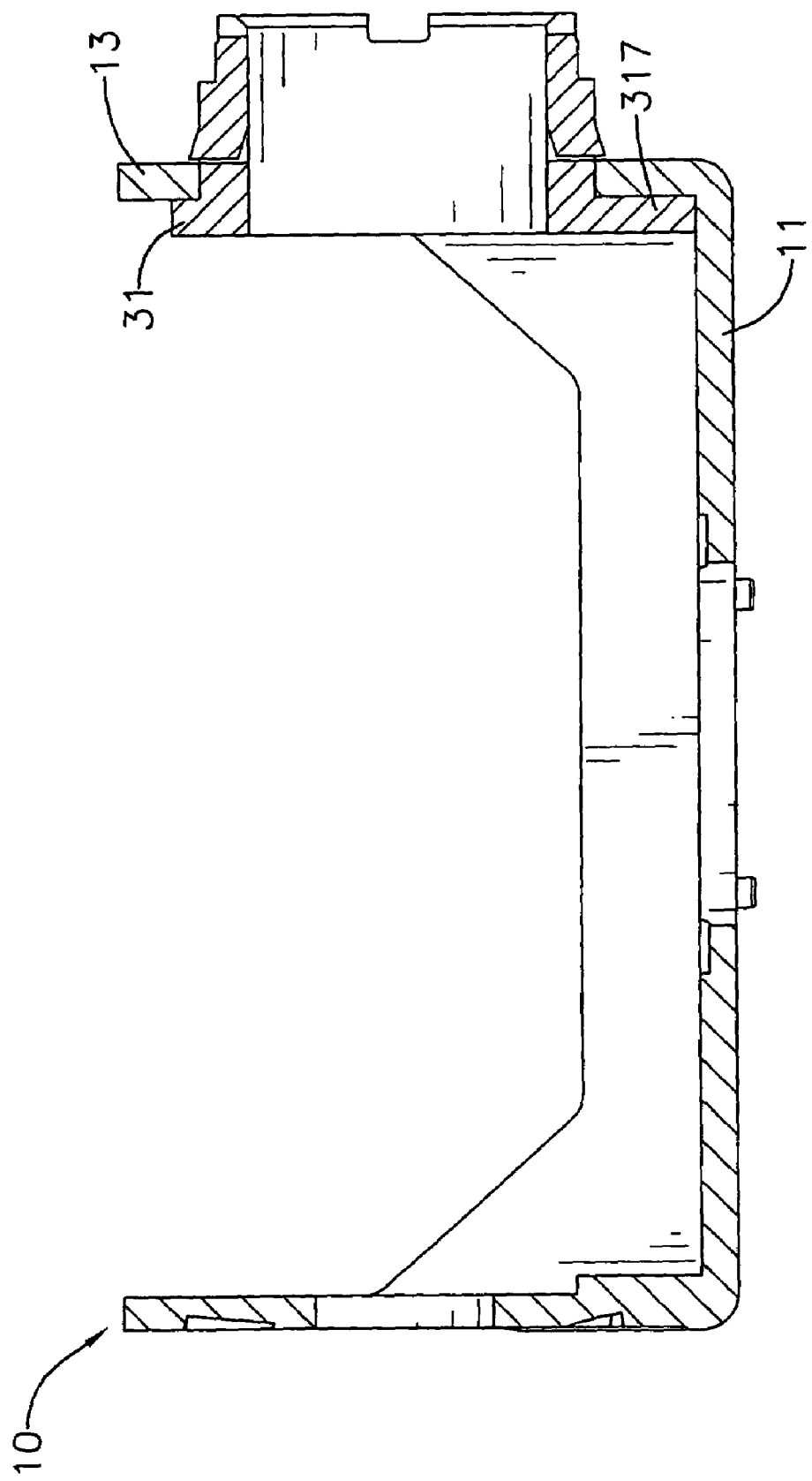
FIG. 15 is a side view in partial section of the barrel and a central bracket of the hinge in FIG. 14.
Figure 16:
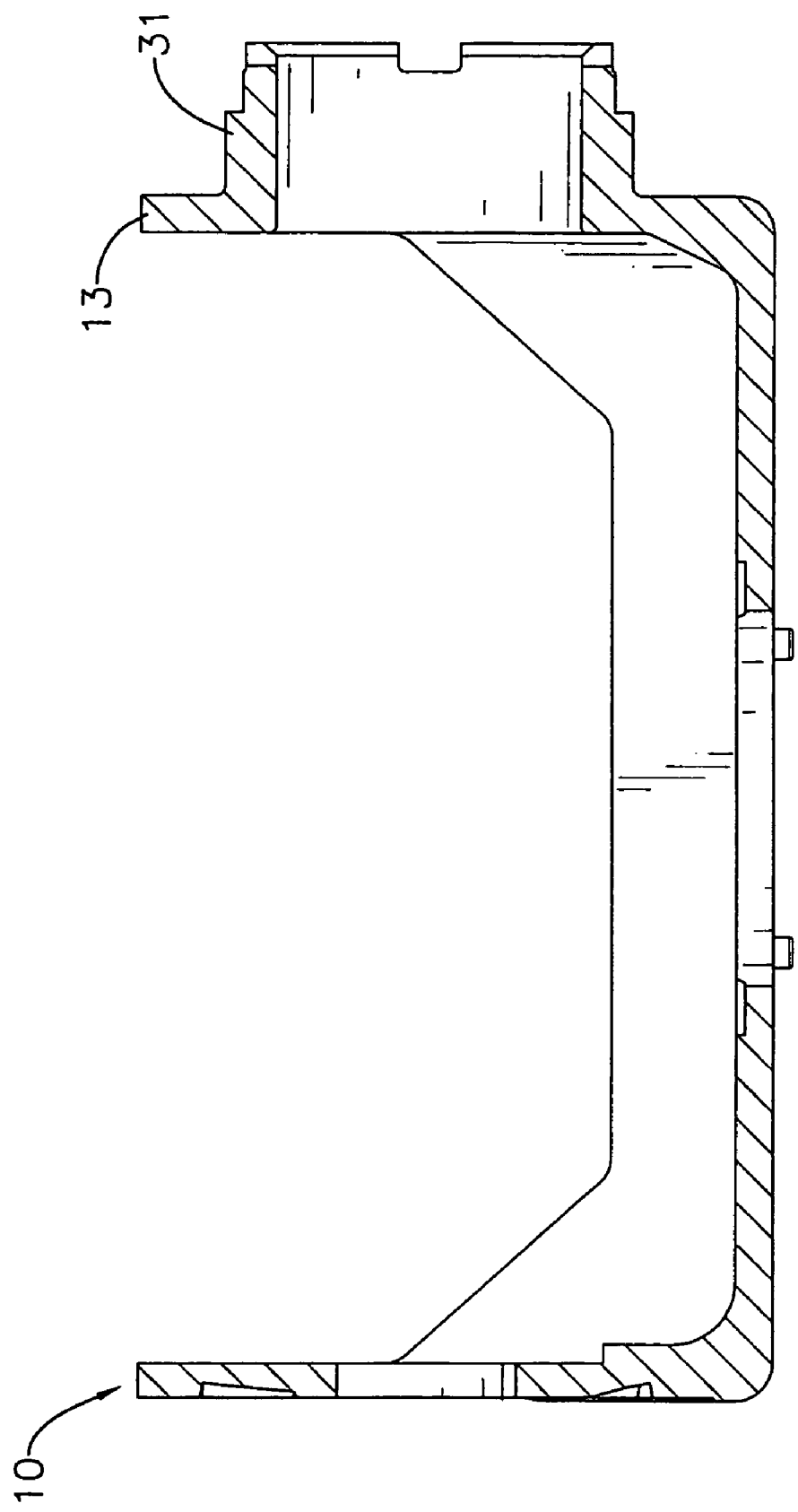
FIG. 16 is a side view in partial section of the barrel and a central bracket of the hinge in FIG. 13.

With further reference to FIG. 13, the stationary limiting spacer (44) is mounted around the central shaft (41) and has a thickness, a limiting protrusion (441) formed radially on an edge of the stationary limiting spacer (44) or a limit protrusion (441') formed axially on the stationary limiting spacer (44).

The rotating limiting spacer (45) is mounted securely on the central shaft (41) and has a thickness, a first limiting protrusion (451) and a second limiting protrusion (452). The thickness of the rotating limiting spacer (45) is thicker than the thickness of the stationary limiting spacer (44). The first and second limiting protrusions (451, 452) are formed axially on the rotating limiting spacer (45) and are opposite to each other. The first limiting protrusion (451) selectively abuts the limiting protrusions (114, 441, 441') of the main arm (11) and the stationary limiting spacer (44).

The fastening bracket (46) is mounted securely on the outer end of the central shaft (41) and has a fastening hole (461), multiple fastening detents (462) and at least one limiting protrusion (463). The fastening detents (462) are formed radially in the fastening hole (461) and engage the fastening protrusions (415) of the central shaft (41) to mount the fastening bracket (46) securely on the central shaft (41). The at least one limiting protrusion (463) is formed on the fastening bracket (46) and corresponds to and selectively abuts the second limiting protrusion (452) of the rotating limiting spacer (45).

Figure 8:
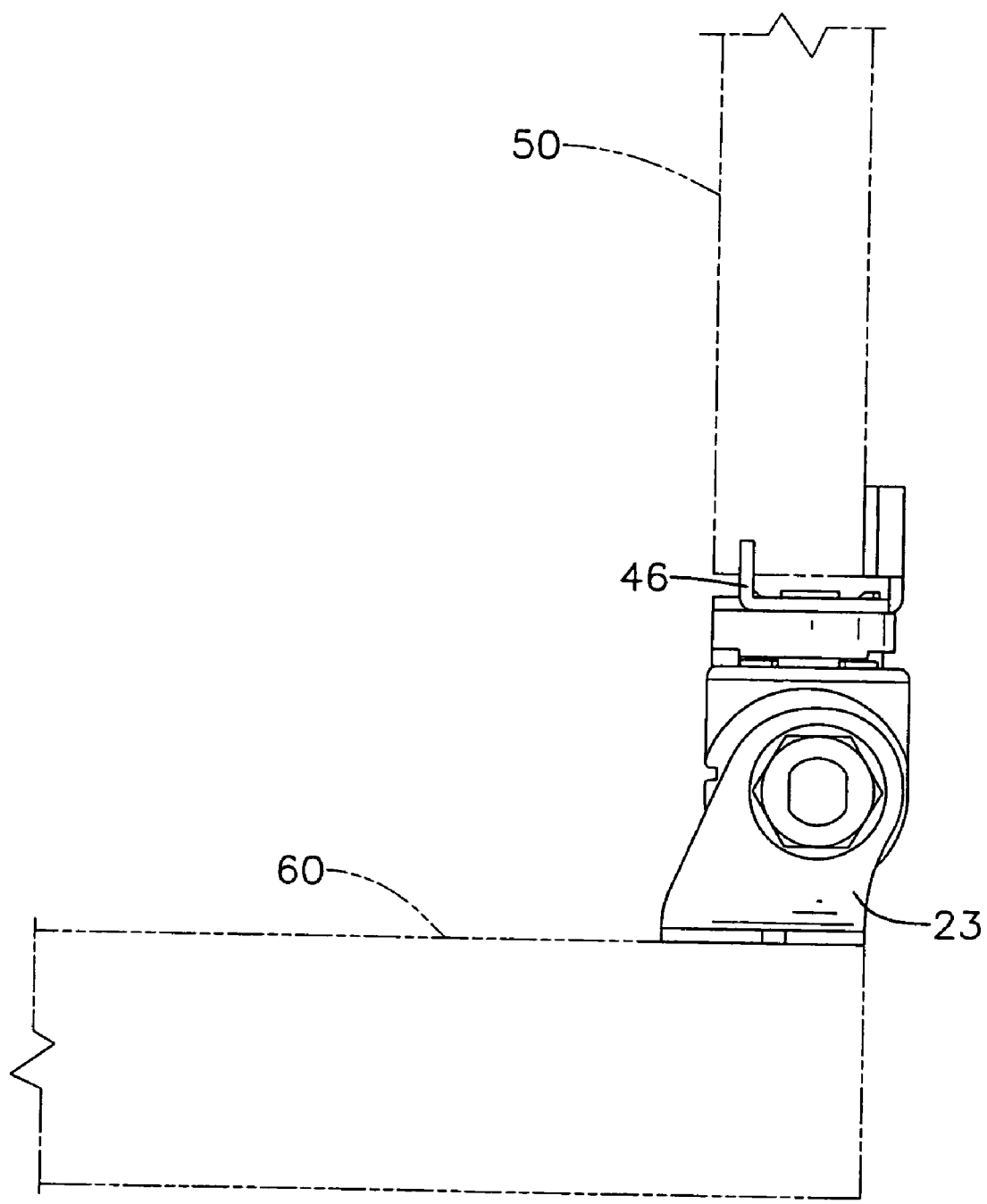
FIG. 8 is an end view of the hinge in FIG. 1 mounted in an electronic device.
Figure 9:
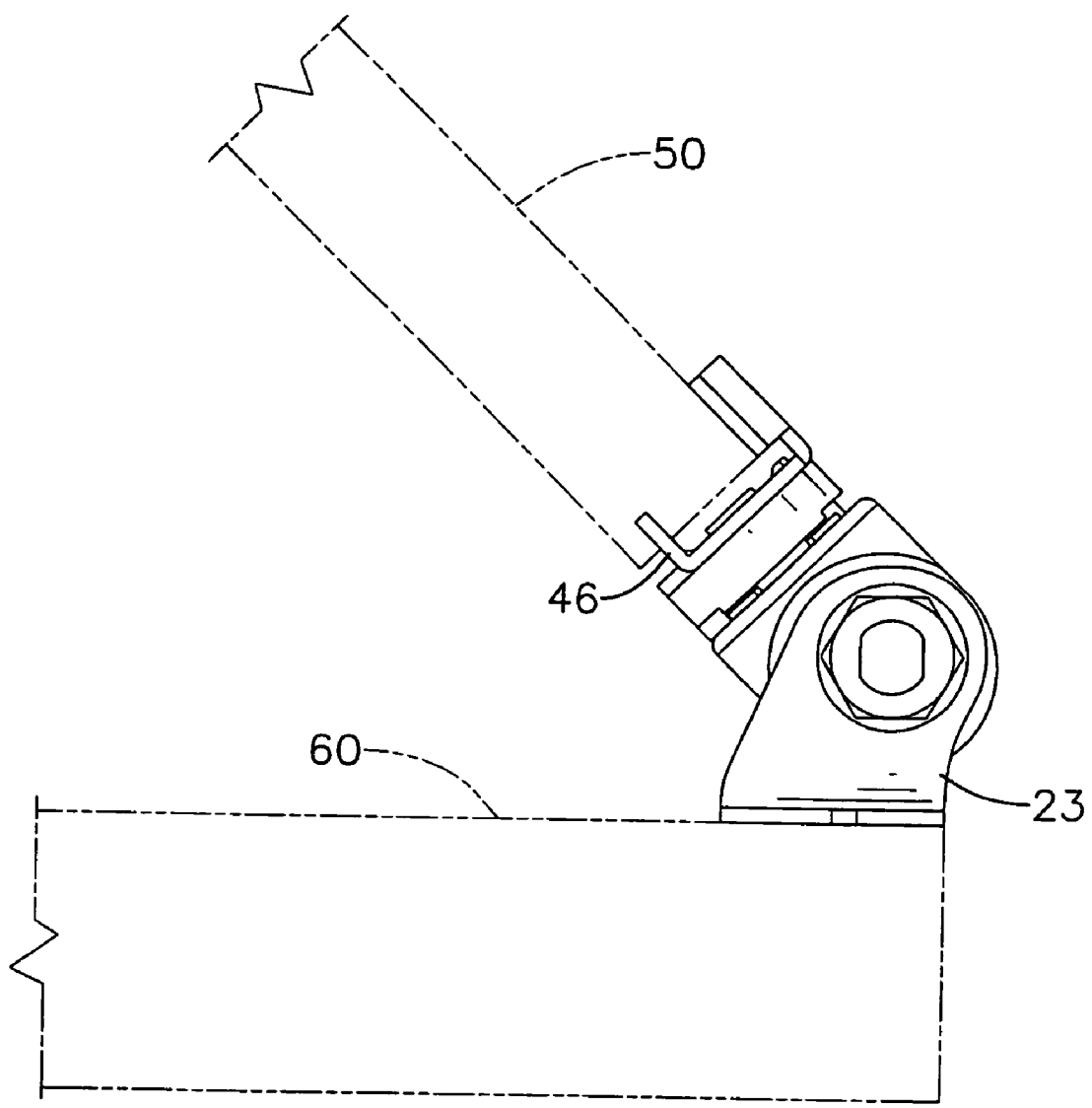
FIG. 9 is an operational end view of the hinge in FIG. 1 mounted in the electronic device when the electronic device is closed.
Figure 10:
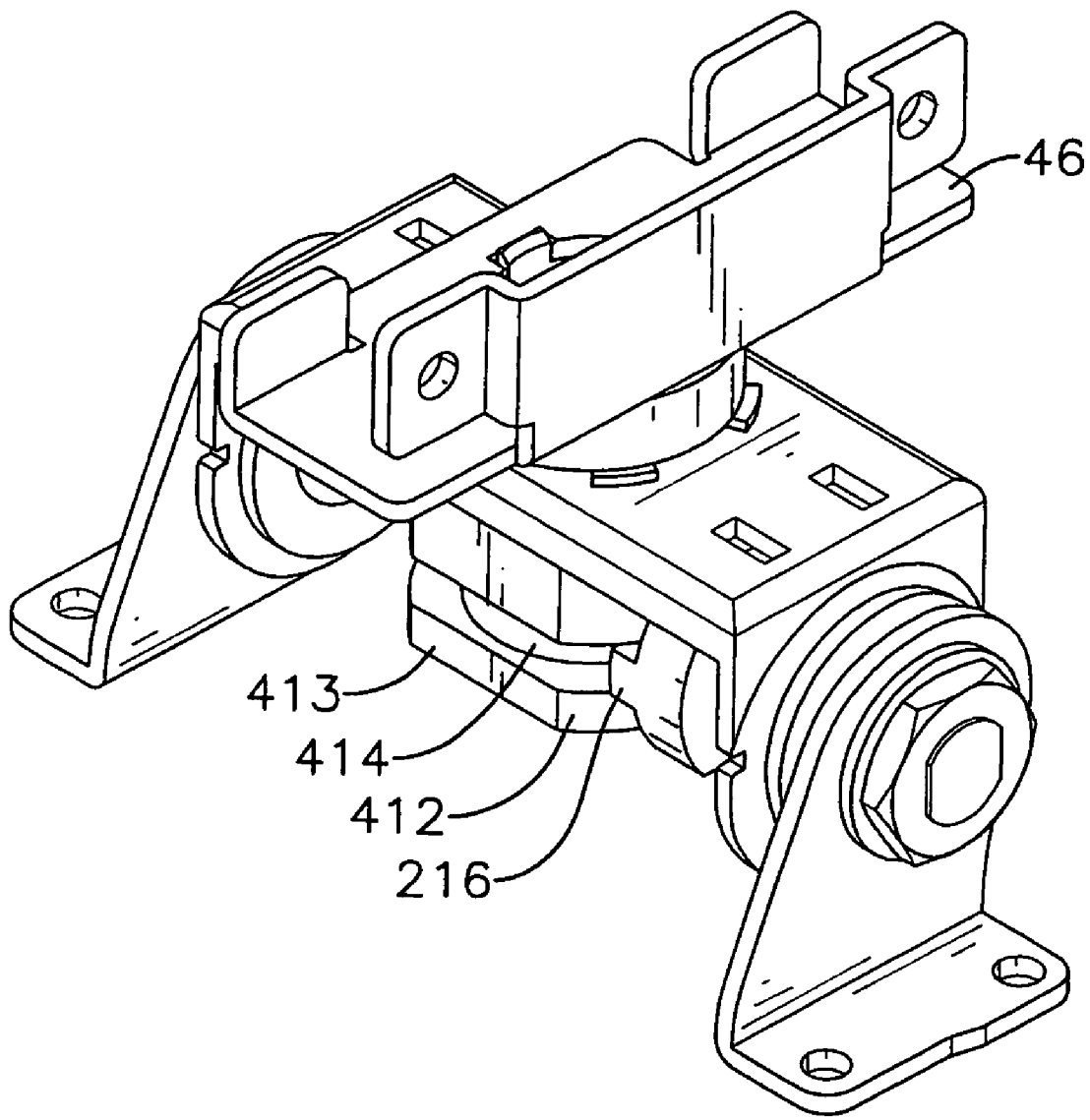
FIG. 10 is an operational perspective view of the hinge in FIG. 1.
Figure 11:
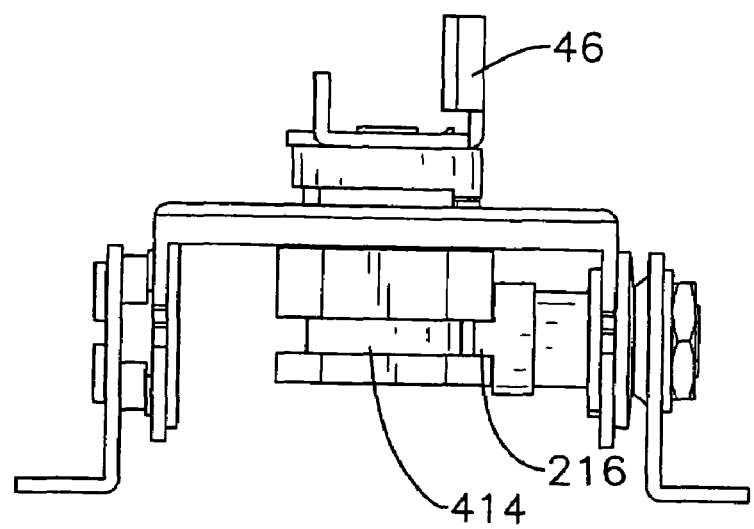
FIG. 11 is an operational side view of the hinge in FIG. 1.
Figure 12:
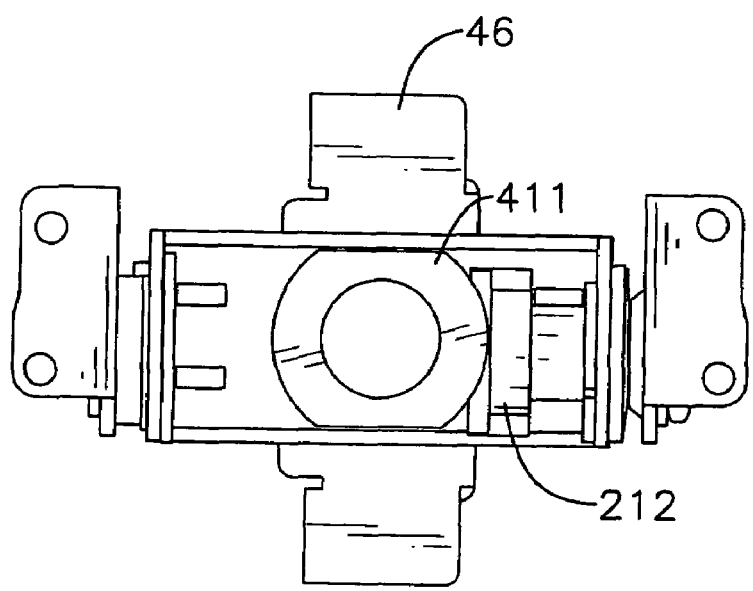
FIG. 12 is an operational bottom view of the hinge in FIG. 1.

With reference to FIGS. 3 and 8, the hinge as described is mounted between a cover (50) and a base (60). The fastening bracket (46) of the rotating hinge assembly (40) is attached to the cover (50). The first and second rotating brackets (23, 32) are attached to the base (60). With further reference to FIG. 9, when the cover (50) is opened or closed relative to the base (60), the cover (50) rotates the central bracket (10) and the rotating hinge assembly (40) relative to the first and second rotating brackets (23, 32). With further reference to FIG. 10, when the cover (50) is rotated relative to the base (60), the cover (50) rotates the fastening bracket (46) relative to the central bracket (10).

With reference to FIGS. 3, 4, 8 and 9, the cover (50) is opened or closed relative to the base (60). The first arm (12) is rotated relative to the tilt shaft (21).

Because the stationary positioning spacer (22) is mounted securely on the tilt shaft (21), the first arm (12) rotates relative to the stationary positioning spacer (22). When the at least one positioning detent (126) of the first arm (12) engages the at least one positioning protrusion (222), the cover (50) is positioned relative to the base (60).

The limiting protrusion (124) of the first arm (12) abuts the limiting protrusion (214) of the tilt shaft (21) to limit the rotating angle of the cover (50).

When the first arm (12) rotates relative to the tilt shaft (21), the limiting head (213) of the tilt shaft (21) rubs against the inner annular recess (122) and the inclined surface (123) of the first arm (12). Because a strength of a material is enhanced when the material is pressed, the inner annular recess (122) and the inclined surface (123) of the first arm (12) enhance the strength of the first arm (12) to reduce the abrasion between the limiting head (213) of the tilt shaft (21). In the same principle, the outer annular recess (125) reduces the abrasion on the outer surface of the first arm (12).

With reference to FIGS. 3, 4, 8 and 10 to 12, the cover (50) is rotated relative to the base (60). The fastening bracket (46) rotates the central shaft (41) relative to the central bracket (10).

Because the rotating positioning spacer (43) is mounted securely on the central shaft (41), the rotating positioning spacer (43) is rotated relative to the main arm (11) of the central bracket (10). When the at least one positioning protrusion (431) of the rotating positioning spacer (43) engages the at least one positioning detent (113) of the main arm (11), the cover (50) is positioned relative to the base (60).

Because the rotating limiting spacer (45) is mounted securely on the central shaft (41), the rotating limiting spacer (45) is rotated relative to the stationary limiting spacer (44) and the main arm (11). The limiting protrusions (451, 452) of the rotating limiting spacer (45) abut the limiting protrusions (114, 441, 441') of the main arm (11) and the stationary limiting spacer (44) to limit the rotating angle of the cover (50).

When the rotating positioning spacer (43) rotates relative the main arm (11), the rotating positioning spacer (43) rubs against the inner surface of the main arm (11). The annular recess (115) of the main arm (11) reduces the abrasion of the main arm (11).

When the flat sides (413) of the limiting head (411) of the central shaft (41) align with the positioning head (212) of the tilt shaft (21), the positioning protrusion (216) is engaged from the annular slot (414) in the limiting head (411) of the central shaft (41) and the limiting head (411) of the central shaft (41) can be rotated relative to the positioning head (212) of the tilt shaft (21). Therefore, the central shaft (41) can be rotated relative to the tilt shaft (21).

When the limiting sides (412) of the limiting head (411) of the central shaft (41) align with the positioning head (212) of the tilt shaft (21), the positioning protrusion (216) engages the annular slot (414) in the limiting head (411) of the central shaft (41) to keep the tilt shaft (21) from rotating relative to the central shaft (41). Therefore, the cover (50) cannot be closed when the cover (50) is rotated relative to the base (60) to prevent unnecessary broken.

With the rotating limiting spacer (45) has the thickness thicker than the thickness of the stationary limiting spacer (44), the rotating limiting spacer (45) replaces many spacers. Therefore, the components of the hinge in accordance with the present invention are simplified and then the manufacturing cost and the assembling complexity are decreased.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hinge comprising:
    a central bracket having
        a main arm having
            a first end; and
            a second end;
        a first arm formed perpendicularly on the first end of the main arm; and
        a second arm formed perpendicularly on the second end of the main arm;
    a first tilt hinge assembly connecting to the first arm of the central bracket and comprising
        a tilt shaft connecting rotatably to the first arm and having
            an inner end;
            a positioning head formed radially on the inner end of the tilt shaft; and
            a positioning protrusion formed axially on an inner surface of the positioning head; and
        a first rotating bracket mounted securely on the tilt shaft;
    a second tilt hinge assembly connecting to the second arm of the central bracket and comprising
        a barrel connecting securely to the second arm of the central bracket; and
        a second rotating bracket mounted rotatably on the barrel; and
    a rotating hinge assembly connecting to the main arm of the central bracket and comprising
        a central shaft connecting rotatably to the main arm of the central bracket and having
            an inner end; and
            a limiting head formed radially on the inner end of the central shaft, corresponding to the positioning head of the tilt shaft and having
                two limiting sides being opposite to each other;
                two flat sides being opposite to each other and formed between two limiting sides, wherein the limiting sides and the flat sides alternatively align with the positioning head of the tilt shaft; and
                an annular slot formed radially in the limiting head of the central shaft and corresponding to and selectively engaging the positioning protrusion of the positioning head of the tilt shaft;

a stationary limiting spacer mounted around the central shaft and having a thickness, a limiting protrusion formed on the stationary limiting spacer;

a rotating limiting spacer mounted securely on the central shaft and having a thickness thicker than the thickness of the stationary limiting spacer;

a first limiting protrusion formed on the rotating limiting spacer and corresponding to and selectively abutting the limiting protrusion on the stationary positioning spacer; and a second limiting protrusion formed axially on the rotating limiting spacer and being opposite to the first limiting protrusion;

a fastening bracket mounted securely on the central shaft and having at least one limiting protrusion formed on the fastening bracket and corresponding to and selectively abutting the second limiting protrusion of the rotating limiting spacer.

2. The hinge as claimed in claim 1, wherein the limiting protrusion of the stationary limiting spacer is formed radially on an edge of the stationary limiting spacer.

3. The hinge as claimed in claim 1, wherein the limiting protrusion is formed axially on the stationary limiting spacer.

4. The hinge as claimed in claim 3, wherein the first arm of the central bracket has at least one positioning detent formed in an outer surface of the first arm;

the first tilt hinge assembly further comprises a resilient stationary positioning spacer mounted securely on the tilt shaft adjacent to the outer surface of the first arm and having an inner surface having an annular edge abutting the outer surface of the first arm;

an outer surface;

a central protrusion formed axially around a central of the outer surface of the stationary positioning spacer; and at least one positioning protrusion formed on the inner surface of the stationary positioning spacer and corresponding to and selectively engaging the at least one positioning detent of the first arm; and the first rotating having a main leaf; and a central protrusion formed axially around a central of an inner surface of the main leaf of the first rotating bracket and abutting the central protrusion of the stationary positioning spacer.

5. The hinge as claimed in claim 4, wherein the main arm of the central bracket has a central hole;

an inner surface; and an annular recess formed in the inner surface of the main arm around the central hole; and the first arm has a central hole;

an inner surface;

an outer surface;

an inner annular recess formed in the inner surface of the first arm around the central hole; and an outer annular recess formed in the outer surface of the first arm around the central hole.

6. The hinge as claimed in claim 5, wherein the barrel being non-circular in cross section and having an inner end;

an outer end;

an outer wall;

multiple steps formed along the outer wall of the barrel and the diameters of the steps being reduced from the inner end to the outer end; and an annular protrusion extending axially from the outer end of the barrel; and the second arm abuts the annular protrusion of the barrel.

7. The hinge as claimed in claim 6, wherein the steps of the barrel comprises a head formed on the inner end of the barrel;

an initial step formed adjacent to the head and mounted tightly in the second arm of the central bracket; and a last step formed on the outer end of the barrel, wherein the head of the barrel has a largest diameter of the steps, the initial step has a second largest diameter of the steps, and the last step has a smallest diameter of the steps; and the second rotating bracket of the second tilt hinge assembly is mounted rotatably on the last step of the barrel.

8. The hinge as claimed in claim 7, wherein the second arm of the central bracket has a central hole; and the initial step of the barrel is mounted tightly in the central hole of the second arm of the central bracket.

9. The hinge as claimed in claim 7, wherein the barrel has fastening protrusion extending radially from the outer wall of the barrel and abutting the outer surface of the second arm.

10. The hinge as claimed in claim 7, wherein the barrel is formed on the second arm.

11. The hinge as claimed in claim 7, wherein the annular protrusion of the barrel has multiple gaps formed in the annular protrusion.

12. The hinge as claimed in claim 11, the barrel has an extension wing extending radially out of the inner end of the barrel and abutting the main arm of the central bracket.

13. The hinge as claimed in claim 12, wherein the first arm has at least one limiting protrusion formed on and extending from an inner surface of the first arm; and the tilt shaft has an outer end; and a limiting head formed radially on the outer end of the tilt shaft and having an outer surface abutting the inner surface of the first arm; and a limiting protrusion formed transversely on an edge of the limiting head and selectively abutting the at least one limiting protrusion of the first arm.

14. The hinge as claimed in claim 13, wherein the main arm of the central bracket has at least one positioning detent formed in the annular recess of the main arm; and the rotating hinge assembly further comprises a rotating positioning spacer that is mounted securely on the central shaft adjacent to the inner surface of the main arm and has at least one positioning protrusion formed on the rotating positioning spacer and corresponding to and selectively engaging the positioning detent of the main arm.

* * * * *